R. O. KING.
RESILIENT WHEEL.
APPLICATION FILED JUNE 19, 1920.
1,383,725.
Patented July 5, 1921.
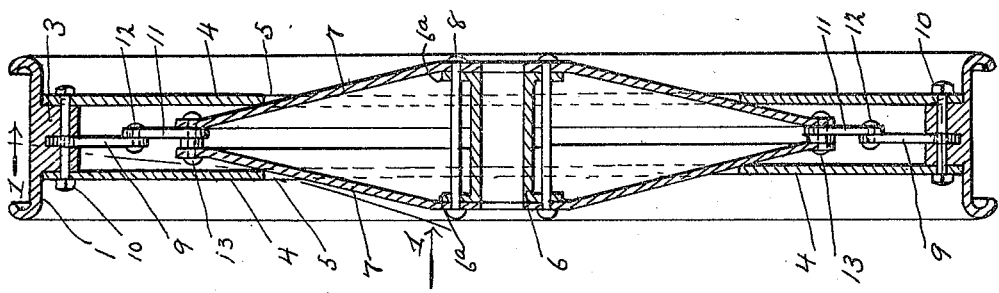
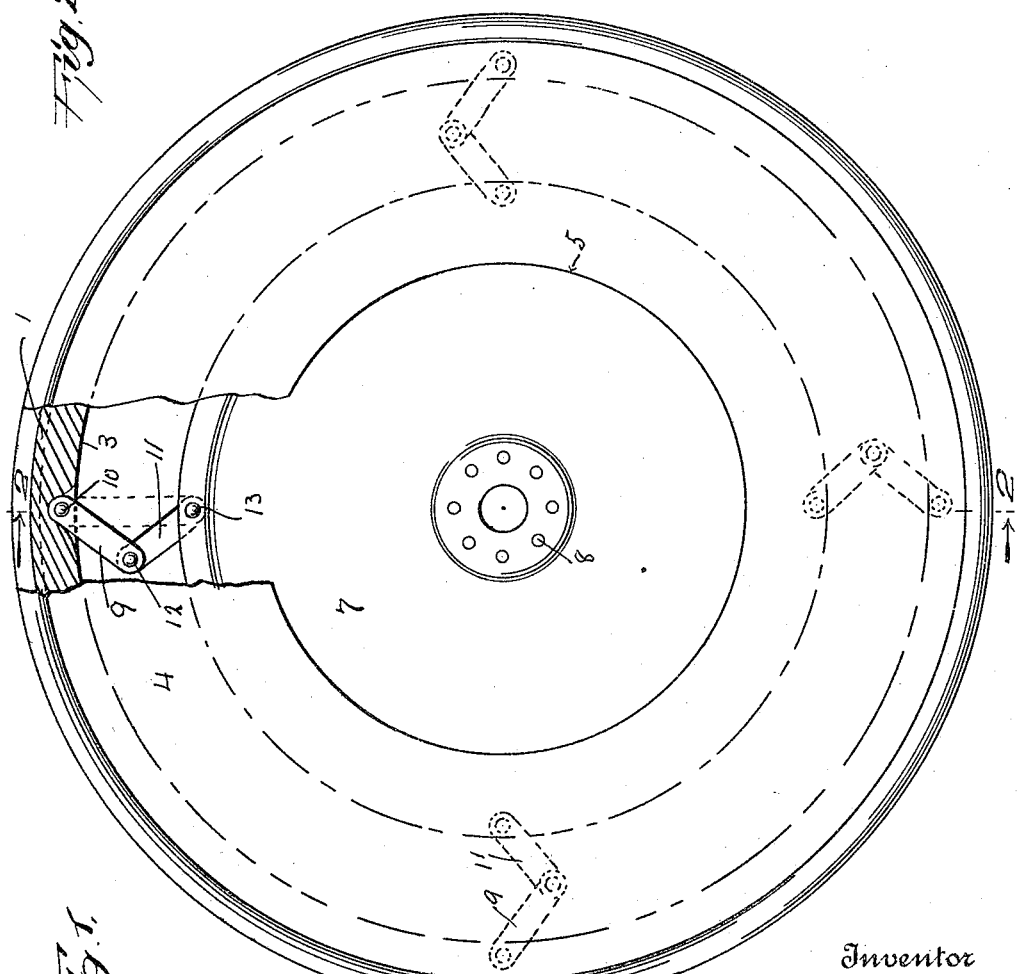
Inventor
Reginald O. King,
By his Attorney
T. F. Bourne

UNITED STATES PATENT OFFICE.

REGINALD O. KING, OF NEW YORK, N. Y.

RESILIENT WHEEL.

1,383,725.  Specification of Letters Patent.  Patented July 5, 1921.

Application filed June 19, 1920. Serial No. 390,166.

*To all whom it may concern:*

Be it known that I, REGINALD O. KING, a subject of the King of England, and resident of New York city, in the county of New York and State of New York, have invented certain new and useful Improvements in Resilient Wheels, of which the following is a specification.

The object of my invention is to provide a wheel, particularly adapted for vehicles, which will have inherent resiliency, and which shall be strong and durable.

My invention comprises novel details of improvement that will be more fully hereinafter set forth and then pointed out in the claim.

Reference is to be had to the accompanying drawings forming part hereof, wherein—

Figure 1 is a partly broken side view of a wheel embodying my invention, and Fig. 2 is a vertical cross section of Fig. 1.

In the accompanying drawings the wheel rim or felly is indicated at 1, which may be of any suitable or usual construction adapted to receive a tire 2. At 3 is indicated a rib extending inwardly from rim 1, which rib may be formed with or secured to rim 1. Plates 4 are secured to rib 3 and extend inwardly within the rim a suitable distance and have centrally disposed registering openings 5. Said plates may be bolted to rib 3, and are shown located along the outer sides of said rib, whereby said plates are spaced apart. Said plates may be made of metal of required thickness to afford a limited degree of resiliency to the plates in a lateral direction. At 6 is a hub to which radially disposed spaced metal disks 7 are secured to operate near their peripheries between the plates 4. The hub 6 is shown provided with end flanges 6ª against which the central portions of the disks 7 may be secured by bolts 8. The disks 7 are shown in concavo-convex or dish-like form, with their convex surfaces disposed outwardly, whereby said surfaces incline or taper from the hub toward the plates 4. In the normal position of the parts the disks 7 bear snugly against the inner edges of the plates 4, whereby the hub is normally retained centrally within the rim.

The friction between the disks 7 and plates 4 may suffice for carrying a load in cases where the wheel merely rolls on the ground without being driven, as for the front wheel of a vehicle. When the wheel is to be driven I preferably connect the rim with the disks 7 so that the latter will pull the former and yet permit relative movement one with relation to the other both radially and annularly. I have shown linkage devices between the rim and disks 7, comprising links 9 pivoted to rib 3 by bolts 10 and links 11 pivoted at 12 to links 9 and pivoted at 13 to disks 7, preferably by bolts. The links 11 are shown pivoted between the outer edges of the disks 7. The disks are kept from squeezing together by the interposed links and washers shown.

When my improved wheels are used on a vehicle the normal load will be supported by the squeezing of disks 7 between plates 4, and when the wheel encounters shocks the disks 7 will tend to crowd between the plates in one direction, whereupon the resiliency of the plates will enable them to spread at their central portions sufficiently to meet the conditions and afford resilient resistance to impact. Since the disks and plates are annular they may move in all radial directions required. Lateral thrusts of the disks will be resisted by the plates, and vice versa, whereby the hub will remain in the proper position. The linkage devices serve to aid in sustaining the disks and hub during rotation of the wheel, since the links tend to straighten due to rotational stress.

The hub as shown is merely conventional, as it may be arranged to receive an axle or to rotate upon bearings in any well known manner.

My improved wheel may be made strong and durable, having no delicate parts to get out of order, and will serve with pneumatic tires although the wheel is particularly adapted for use with so-called solid rubber tires.

Having now described my invention, what I claim is:

A wheel comprising a rim, plates secured to and extending inwardly from the rim in spaced relation and having inner openings, and a hub having disks extending outwardly in spaced relation and having their outer portions entering between and engaging said plates, said disks being inclined toward said plates, and linkage devices connecting the inner portion of the rim with the outer portion of said disks and located in the space therebetween.

Signed at New York city, in the county of New York and State of New York, this 10th day of June, A. D. 1920.

REGINALD O. KING.